US006886104B1

(12) United States Patent
McClurg et al.

(10) Patent No.: US 6,886,104 B1
(45) Date of Patent: Apr. 26, 2005

(54) RECHARGEABLE MOBILE HAND-HELD FINGERPRINT SCANNER WITH A DATA AND POWER COMMUNICATION INTERFACE

(75) Inventors: George William McClurg, Jensen Beach, FL (US); David Brunell, West Palm Beach, FL (US); Walter Guy Scott, North Palm Beach, FL (US)

(73) Assignee: Cross Match Technologies, Palm Beach Gardens, FL (US)

( * ) Notice: Subject to any disclaimer, the term of this patent is extended or adjusted under 35 U.S.C. 154(b) by 427 days.

(21) Appl. No.: 09/599,255

(22) Filed: Jun. 23, 2000

Related U.S. Application Data

(63) Continuation of application No. PCT/US99/22709, filed on Oct. 1, 1999.
(60) Provisional application No. 60/140,754, filed on Jun. 25, 1999.

(51) Int. Cl.$^7$ .............................. G06F 9/00; G06F 1/26
(52) U.S. Cl. ........................ 713/300; 320/156; 382/124
(58) Field of Search ................................ 713/300, 186; 382/115, 124; 235/380, 972.01; 320/156

(56) References Cited

U.S. PATENT DOCUMENTS

| | | | |
|---|---|---|---|
| 2,500,017 A | 3/1950 | Altman | 88/57 |
| 3,200,701 A | 8/1965 | White | 88/14 |
| 3,482,498 A | 12/1969 | Becker | 95/12 |
| 3,527,535 A | 9/1970 | Monroe | 356/71 |
| 3,617,120 A | 11/1971 | Roka | 353/28 |
| 3,699,519 A | 10/1972 | Campbell | 340/146.3 E |
| 3,947,128 A | 3/1976 | Weinberger et al. | 356/71 |
| 3,968,476 A | 7/1976 | McMahon | 340/146.3 E |

(Continued)

FOREIGN PATENT DOCUMENTS

| | | | |
|---|---|---|---|
| EP | 0 101 772 A1 | 3/1984 | G07C/9/00 |
| EP | 0 308 162 A2 | 3/1989 | A61B/5/10 |
| EP | 0 379 333 A1 | 7/1990 | G07F/7/10 |

(Continued)

OTHER PUBLICATIONS

Robert A. Powers, "Advances and Trends in Primary and Small Secondary Batteries," Battery Conference on Applications and Advances, 1994., Proceedings of the Ninth Annual, Jan. 11–13, 1994 pp. 80–85.*
English–language Abstract of Japanese Patent Publication No. 11–225272, 2 Pages (Aug. 17, 1999—Date of publication of application).
English–language Abstract of Japanese Patent Publication No. 11–289421, 2 Pages (Oct. 19, 1999—Date of publication of application).

(Continued)

*Primary Examiner*—Thomas Lee
*Assistant Examiner*—Albert Wang
(74) *Attorney, Agent, or Firm*—Sterne, Kessler, Goldstein and Fox P.L.L.C.

(57) ABSTRACT

A mobile, hand-held fingerprint scanner is recharged by a data and power communication interface. The mobile, hand-held fingerprint scanner includes a rechargeable power supply and a data and power communication interface. The rechargeable power supply powers the fingerprint scanner during mobile use. In one example, the rechargeable power supply includes at least one rechargeable battery, a charging circuit, and a voltage regulator circuit. Data and recharging power is carried over the sane interface. A separate plug for power is not needed. The fingerprint scanner can then be inserted quickly and easily in a docking station as only a single data and power communication interface need be coupled. This is particularly advantageous in law enforcement applications where mobile use is important and safety can be compromised if a mobile scanner does not couple to a docking station quickly and easily.

14 Claims, 3 Drawing Sheets

U.S. PATENT DOCUMENTS

| | | | |
|---|---|---|---|
| 4,032,975 A | 6/1977 | Malueg et al. | 358/213 |
| 4,063,226 A | 12/1977 | Kozma et al. | 365/125 |
| 4,210,899 A | 7/1980 | Swonger et al. | 340/146.3 E |
| 4,414,684 A | 11/1983 | Blonder | 382/4 |
| 4,537,484 A | 8/1985 | Fowler et al. | 354/62 |
| 4,544,267 A | 10/1985 | Schiller | 356/71 |
| 4,601,195 A | 7/1986 | Garritano | 73/60 |
| 4,681,435 A | 7/1987 | Kubota et al. | 356/71 |
| 4,783,823 A | 11/1988 | Tasaki et al. | 382/4 |
| 4,784,484 A | 11/1988 | Jensen | 356/71 |
| 4,792,226 A | 12/1988 | Fishbine et al. | 356/71 |
| 4,811,414 A | 3/1989 | Fishbine et al. | 382/52 |
| 4,876,726 A | 10/1989 | Capello et al. | 382/4 |
| 4,924,085 A | 5/1990 | Kato et al. | 250/227.28 |
| 4,933,976 A | 6/1990 | Fishbine et al. | 382/4 |
| 4,995,086 A | 2/1991 | Lilley et al. | 382/4 |
| 5,054,090 A | 10/1991 | Knight et al. | 382/4 |
| 5,067,162 A | 11/1991 | Driscoll, Jr. et al. | 382/5 |
| 5,067,749 A | 11/1991 | Land | 283/117 |
| 5,131,038 A | 7/1992 | Puhl et al. | 380/23 |
| 5,146,102 A | 9/1992 | Higuchi et al. | 250/556 |
| 5,157,497 A | 10/1992 | Topper et al. | |
| 5,187,747 A | 2/1993 | Capello et al. | 382/4 |
| 5,222,152 A | 6/1993 | Fishbine et al. | 382/2 |
| 5,230,025 A | 7/1993 | Fishbine et al. | 382/4 |
| 5,233,404 A | 8/1993 | Lougheed et al. | 356/71 |
| 5,249,370 A | 10/1993 | Stanger et al. | 34/22 |
| 5,285,293 A | 2/1994 | Webb et al. | |
| D348,445 S | 7/1994 | Fishbine et al. | D14/107 |
| D351,144 S | 10/1994 | Fishbine et al. | D14/107 |
| 5,384,621 A | 1/1995 | Hatch et al. | 355/204 |
| 5,412,463 A | 5/1995 | Sibbald et al. | 356/71 |
| 5,416,573 A | 5/1995 | Sartor, Jr. | 356/71 |
| 5,467,403 A | 11/1995 | Fishbine et al. | 382/116 |
| 5,469,506 A | 11/1995 | Berson et al. | 380/23 |
| 5,473,144 A | 12/1995 | Mathurin, Jr. | 235/380 |
| 5,509,083 A | 4/1996 | Abtahi et al. | 382/124 |
| 5,517,528 A | 5/1996 | Johnson | 375/259 |
| 5,528,355 A | 6/1996 | Maase et al. | 356/71 |
| 5,548,394 A | 8/1996 | Giles et al. | 356/71 |
| 5,591,949 A | 1/1997 | Bernstein | 235/380 |
| 5,596,454 A | 1/1997 | Hebert | 359/726 |
| 5,598,474 A | 1/1997 | Johnson | 380/23 |
| 5,613,014 A | 3/1997 | Eshera et al. | 382/124 |
| 5,615,277 A | 3/1997 | Hoffman | 382/115 |
| 5,625,448 A | 4/1997 | Ranalli et al. | 356/71 |
| 5,640,422 A | 6/1997 | Johnson | 375/259 |
| 5,649,128 A | 7/1997 | Hartley | 395/309 |
| 5,650,842 A | 7/1997 | Maase et al. | 356/71 |
| 5,661,451 A | 8/1997 | Pollag | 340/426 |
| 5,680,205 A | 10/1997 | Borza | 356/71 |
| 5,689,529 A | 11/1997 | Johnson | 375/259 |
| 5,717,777 A | 2/1998 | Wong et al. | 382/124 |
| 5,745,684 A | 4/1998 | Oskouy et al. | 395/200.8 |
| 5,748,766 A | 5/1998 | Maase et al. | 382/124 |
| 5,755,748 A | 5/1998 | Borza | 607/61 |
| 5,778,089 A | 7/1998 | Borza | 382/124 |
| 5,781,647 A | 7/1998 | Fishbine et al. | 382/1 |
| 5,793,218 A | 8/1998 | Oster et al. | 324/754 |
| 5,801,681 A | 9/1998 | Sayag | |
| 5,805,777 A | 9/1998 | Kuchta | 395/112 |
| 5,812,067 A | 9/1998 | Bergholz et al. | 340/825.31 |
| 5,815,252 A | 9/1998 | Price-Francis | 356/71 |
| 5,818,956 A | 10/1998 | Tuli | 382/126 |
| 5,822,445 A | 10/1998 | Wong | 382/127 |
| 5,825,005 A | 10/1998 | Behnke | 235/380 |
| 5,825,474 A | 10/1998 | Maase | 356/71 |
| 5,828,773 A | 10/1998 | Setlak et al. | 382/126 |
| 5,832,244 A | 11/1998 | Jolley et al. | 395/309 |
| 5,848,231 A | 12/1998 | Teitelbaum et al. | 395/186 |
| 5,855,433 A | 1/1999 | Velho et al. | |
| 5,859,420 A | 1/1999 | Borza | 250/208.1 |
| 5,862,247 A | 1/1999 | Fisun et al. | 382/116 |
| 5,867,802 A | 2/1999 | Borza | 701/35 |
| 5,869,822 A | 2/1999 | Meadows, II et al. | 235/380 |
| 5,872,834 A | 2/1999 | Teitelbaum | 379/93.03 |
| 5,900,993 A | 5/1999 | Betensky | 359/710 |
| 5,907,627 A | 5/1999 | Borza | 382/124 |
| 5,920,384 A | 7/1999 | Borza | 356/71 |
| 5,920,640 A | 7/1999 | Salatino et al. | 382/124 |
| 5,928,347 A | 7/1999 | Jones | 710/129 |
| 5,960,100 A | 9/1999 | Hargrove | 382/124 |
| 5,973,731 A | 10/1999 | Schwab | 348/161 |
| 5,974,162 A | 10/1999 | Metz et al. | 382/124 |
| 5,987,155 A | 11/1999 | Dunn et al. | 382/116 |
| 5,995,014 A | 11/1999 | DiMaria | 340/825.31 |
| 6,011,486 A | 1/2000 | Casey | 340/7.29 |
| 6,018,739 A | 1/2000 | McCoy et al. | 707/102 |
| 6,023,522 A | 2/2000 | Draganoff et al. | 382/124 |
| 6,041,372 A | 3/2000 | Hart et al. | 710/62 |
| 6,064,398 A | 5/2000 | Ellenby et al. | |
| 6,075,876 A | 6/2000 | Draganoff | 382/124 |
| 6,078,265 A | 6/2000 | Bonder et al. | 340/825.31 |
| 6,088,585 A | 7/2000 | Schmitt et al. | 455/411 |
| 6,104,809 A | 8/2000 | Berson et al. | 380/23 |
| 6,125,192 A | 9/2000 | Bjorn et al. | 382/124 |
| 6,144,408 A | 11/2000 | MacLean | |
| 6,154,010 A | 11/2000 | Geiger | 320/137 |
| 6,178,514 B1 | 1/2001 | Wood | 713/300 |
| 6,298,395 B1 * | 10/2001 | Kurase | 710/15 |
| 6,317,544 B1 | 11/2001 | Diehl et al. | 385/115 |
| 6,320,974 B1 | 11/2001 | Glaze et al. | 382/115 |

FOREIGN PATENT DOCUMENTS

| | | | |
|---|---|---|---|
| EP | 0 623 890 A2 | 11/1994 | G06K/9/38 |
| EP | 0 653 882 A1 | 5/1995 | |
| EP | 0 379 333 B1 | 7/1995 | G07F/7/10 |
| EP | 0 889 432 A2 | 1/1999 | G06K/9/00 |
| EP | 0 905 646 A1 | 3/1999 | G06K/11/18 |
| EP | 0 924 656 A2 | 6/1999 | G07C/9/00 |
| GB | 2 089 545 A | 6/1982 | G06K/9/20 |
| GB | 2313661 | 11/1997 | |
| JP | 11-225272 | 8/1999 | |
| JP | 11-289421 | 10/1999 | |
| WO | WO 87/02491 | 4/1987 | G07C/9/00 |
| WO | WO 90/03620 | 4/1990 | G06K/9/20 |
| WO | WO 92/11608 | 7/1992 | G06K/9/00 |
| WO | WO 94/22371 | 10/1994 | A61B/5/117 |
| WO | WO 96/17480 | 6/1996 | H04N/13/93 |
| WO | WO 97/29477 | 8/1997 | G09G/5/08 |
| WO | WO 97/41528 | 11/1997 | G06K/9/00 |
| WO | WO 98/09246 | 3/1998 | G06K/9/00 |
| WO | WO 98/12670 | 3/1998 | G07C/9/00 |
| WO | WO 99/12123 | 3/1999 | G06K/9/00 |
| WO | WO 99/26187 | 5/1999 | G06K/9/00 |
| WO | WO-99-28701 | 6/1999 | |
| WO | WO 99/40535 | 8/1999 | G06K/9/00 |

OTHER PUBLICATIONS

Btt (Biometric Technology Today), Finger technologies contacts, 2 pages.

Drake, M.D. et al., "Waveguide hologram fingerprint entry device," *Optical Engineering,* vol. 35, No. 9, Sep. 1996, pp. 2499–2505.

Roethenbaugh, G. (ed.), *Biometrics Explained,* 1998, ICSA, pp. 1–34.

Automated Identification Systems (visited May 20, 1999) <http://www.trw.com/idsystems/bldgaccess2.html>, 1 page, Copyright 1999.

Ultra–Scan Corporation Home Page (visited May 20, 1999) <http://www.ultra-scan.com/index.htm>, 3 pages. (discusses technology as early as 1996).

Profile (last updated Aug. 16, 1998) <http://www.dermalog.de/Britain/Profile/profile.htm>, 3 pages. (discusses technology as early as 1990).

ID–Card System Technical Specifications (last updated Jul. 18, 1998) <http://dermalog.de/Britain/Products/ID-Card/idcard2.htm>, 2 pages.

Fujitsu Limited Products and Services (updated Apr. 21, 1999) <http://www.fujitsu.co.jp/hypertext/Products/index-e.html>, 3 pages, Copyright 1995–1999.

SonyDCam (visited May 20, 1999) <http://www.microsoft.com/DDK/ddkdocs/Win2k/sonydcam.htm>, 3 pages, Copyright 1999.

Verid Fingerprint Verification (visited May 17, 1999) <http://www.tssi.co.uk/products/finger.html>, 2 pages.

Startek's Fingerprint Verification Products: Fingerguard FG–40 (visited May 18, 1999) <http://www.startek.com.tw/product/fg40/fg40.html>, 3 pages.

SAC Technologies Showcases Stand–Alone SAC–Remote(TM) visited May 18, 1999) <http://www.pathfinder.com/money/latest/press/PW/1998Mar25/1026.html>, 2 pages.

"Biometrics, The Future Is Now," www.securitymagazine.com, May 1999, pp. 25–26.

Mytec Technologies Gateway, (visited Apr. 27, 1999) <http://www.mytec.com/Products/Gateway/>, 1 page.

Mytec Technologies Gateway: Features & Benefits, (visited Apr. 27, 1999) <http://www.mytec.com/Products/Gateway/features.htm>, 1 page.

Mytec Technologies Touchstone Pro, (visited Apr. 27, 1999) <http://www.mytec.com/Products/Touchstone/>, 1 page.

Mytec Technologies Touchstone Pro: Features, (visited Apr. 27, 1999) <http://www.mytec.com/Products/Touchstone/features.htm>, 1 page.

Electronic Timeclock Systems and Biometric Readers (last updated Apr. 17, 1999) <http://www.lfs-hr-bene.com/tclocks.html>, 1 page.

Fingerprint Time Clock (visited May 17, 1999) <http://www.lfs-hr-bene.com/Biometrics/Fingerprintclock.html>, 6 pages.

KC–901: The KSI fingerprint sensor (visited May 17, 1999) <http://www.kinetic.bc.ca/kc-901.html>, 3 pages.

Intelnet Inc. (visited May 20, 1999) <http://www.intelgate.com/index.html>, 1 page, Copyright 1996.

Ver–i–Fus Fingerprint Access Control System (visited May 20, 1999) <http://www.intelgate.com/verifus.htm>, 2 pages. (Ver–i–fus product released in 1995).

Ver–i–fus® Configurations (visited May 20, 1999) <http://www.intelgate.com/verconfig.htm>, 1 page. (Ver–i–fus product released in 1995).

Ver–i–Fus® & Ver–i–Fus$^{mil*}$ (visited May 20, 1999) <http://www.intelgate.com/vif_data.htm>, 3 pages. (Ver–i–fus product released in 1995).

Access Control System Configurations (visited May 20, 1999) <http://www.intelgate.com/access.htm>, 2 pages. (Ver–i–fus product released in 1995).

Company (visited May 17, 1999) <http://www.instainfo.com/company.htm>, 2 pages.

TouchLock™ II Fingerprint Identity Verification Terminal (visited May 17, 1999) <http://www.identix.com/TLock.htm>, 4 pages.

Physical Security and Staff Tracking Solution (visited May 17, 1999) <http://www.identix.com/products/biosecurity.html>, 3 pages, Copyright 1996–1998.

Veriprint2000 Fingerprint Verification Terminal For Use With Jantek Time & Attendance Software (visited May 17, 1999) <http://www.hunterequipment.com/fingerprint.htm>, 2 pages.

Veriprint Product Applications (visited Apr. 27, 1999) <http://www.biometricid.com/uses.htm>, 1 page, Copyright 1999.

BII Home Page (visited Apr. 27, 1999) <http://www.biometricid.com/homepage.htm>, 1 page, Copyright 1999.

Veriprint 2100 Stand–Alone Fingerprint Verification Terminal (visited Apr. 27, 1999) <http://www.biometricid.com/veriprint2100.htm>, 3 pages.

Randall, N., "A Serial Bus on Speed," *PC Magazine,* May 25, 1999, pp. 201–203.

The DERMALOG Check–ID (visited Nov. 12, 1999) <http://www.dermalog.de/ganzneu/products_check.html>, 1 page.

Check–ID Specifications and Features (visited Nov. 12, 1999) <http://www.dermalog.de/ganzneu/spec_check.html>, 1 page, Copyright 1999.

Startek's Fingerprint Verification Products: FingerFile 1050 (visited Oct. 8, 1999) <http://www.startek.com.tw/product/ff1050/ff1050.html>, 3 pages.

Time is Money! (visited Jun. 5, 1998) <http://www.iaus.com/afim.htm>, 3 pages.

LS 1 LiveScan Blocking Workstation High Performance Finger & Palm Scanning System (visited Jun. 4, 1998) <http://www.hbs-jena.com/ls1.htm>, 6 pages, Copyright 1998.

Welcome to the Homepage of Heimann Biometric Systems GMBH (visited Jun. 4, 1998) <http://www.hbs-jena.com/>, 1 page, Copyright 1998.

Heimann Biometric Systems Corporate Overview (visited Jun. 4, 1998) <http://www.hbs-jena.com/company.htm>, 4 pages, Copyright 1998.

Remote Access Positive IDentification—raPID (visited Jun. 3, 1998) <http://www.nec.com...>, 2 pages, Copyright 1997.

Morpho DigiScan Cellular (visited Jun. 3, 1998) <http://www.morpho.com/products/law_enforcement/digiscan/cellular.htm>, 2 pages, Copyright 1998.

A.F.I.S. (last updated Apr. 2, 1998) <http://www.dermalog.de/afis.htm>, 2 pages.

Morpho FlexScan Workstation (visited Jun. 3, 1998) <http://www.morpho.com/products/law_enforcement/flexscan/>, 2 pages, Copyright 1998.

True–ID® The LiveScan with special "ability" . . . , 2 pages.

Printrak International: User List (visited Jun. 3, 1998) <http://www.printrakinternational.com and links>, 10 pages, Copyright 1996.

Live–Scan Products: Tenprinter® 1133S (visited Apr. 23, 1999) <http://www.digitalbiometrics.com/Products/tenprinter.htm>, 4 pages. (Tenprinter 1133S released in 1996).

TouchPrint™ 600 Live–Scan System (visited Apr. 23, 1999) <http://www.identix.com/products/livescan.htm>, 4 pages, Copyright 1996–1998.

Systems for Live–Scan Fingerprinting, Digital Biometrics, Inc., 8 pages, Copyright 1998.

DBI FingerPrinter CMS, Digital Biometrics, Inc., 5 pages. (CMS released in 1998).

Fingerscan V20, Identix Incorporated, 1 page, Copyright 1999.

Verid Fingerprint Reader, TSSI, 4 pages.
Response to Request for Information, Cross Match Technologies, Inc., 13 pages, Apr. 14, 1999.
Startek's Fingerprint Verification Products (visited Nov. 17, 1999) <http://www.startek.com.tw/product/index.html>, 1 page.
Introduction to Startek's Fingerprint Verification Products (visited Nov. 17, 1999) <http://www.startek.com.tw/product/index2.html>, 2 pages.
Automatic Fingerprint Identification Systems (visited Nov. 17, 1999) <http://www.sagem.com/en/produit4-en/empreinte-dig-en.htm>, 1 page.
Digital Biometrics Corporate Information (visited Nov. 17, 1999) <http://www.digitalbiometrics.com/Corporate_info/Corporate_info.htm>, 2 pages. (discusses technology as early as 1985).
DBI Live-Scan Products: Digital Biometrics TenPrinter (visited Nov. 17, 1999) <http://www.digitalbiometrics.com/products/tenprinter.htm>, 4 pages. (Tenprinter released in 1996).
DBI Live-Scan Products: Networking Options (visited Nov. 17, 1999) <http://www.digitalbiometrics.com/products/networking_options.htm>, 3 pages.
DBI Live-Scan Products: Digital Biometrics FingerPrinter CMS (visited Nov. 17, 1999) <http://www.digitalbiometrics.com/products/FingerPrinterCMS.htm>, 3 pages. (CMS released in 1998).
DBI Live-Scan Products: Image Printer Stations (visited Nov. 17, 1999) <http://www.digitalbiometrics.com/products/imageprinter.htm>, 2 pages.
DBI Live-Scan Products: FC-21 Fingerprint Capture Station (visited Nov. 17, 1999) <http://www.digitalbiometrics.com/products/Fingerprintcapture.htm>, 2 pages.
Series 400 OEM Scanner (visited Nov. 17, 1999) <http://www.ultra-scan.com/400.htm>, 3 pages. (Scanner released in 1996).
USC Scanner Design (visited Nov. 17, 1999) <http://www.ultra-scan.com/scanner.htm>, 4 pages. (Scanner released in 1996).
Series 500/600 Scanners (visited Nov. 17, 1999) <http://www.ultra-scan.com/500.htm>, 3 pages. (Scanner released in 1996).
Series 700 ID Station (visited Nov. 17, 1999) <http://www.ultra-scan.com/700.htm>, 3 pages. (Scanner released in 1998).
Identix: The Corporation (visited Nov. 17, 1999) <http://www.identix.com/corporate/home.htm>, 2 pages, Copyright 1996–1998.
Biometric Imaging Products (visited Nov. 17, 1999) <http://www.identix.com/products/bioimage.htm>, 1 page, Copyright 1996–1998.
TouchPrint™ 600 Live-Scan System (visited Nor. 17, 1999) <http://www.identix.com/products/livescan.htm>, 4 pages, Copyright 1996–1998.
TouchPrint™ 600 Palm Scanner (visited Nov. 17, 1999) <http://www.identix.com/products/palmscan.htm>, 3 pages, Copyright 1996–1998.
TouchPrint™ 600 Card Scan System (visited Nov. 17, 1999) <http://www.identix.com/products/cardscan.htm>, 3 pages, Copyright 1996–1998.
DERMALOG Key—The safest and easiest way of access control (Last updated Jul. 18, 1998) <http://www.dermalog.de/Britain/Products/Key/key.htm>, 1 page.
DERMALOG Finger-ID Your small size solution for high security (Last updated Jul. 18, 1998) <http://www.dermalog.de/Britain/Products/Finger/fingerid.htm>, 1 page.
Mytec: Corporate (visited Nov. 17, 1999) <http://www.mytec.com/corporate/>, 2 pages.
Kinetic Sciences Inc. Fingerprint Biometrics Division (visited Nov. 17, 1999) <http://www.kinetic.bc.ca/main/FP-B.html>, 1 page.
Fingerprint Biometrics: Securing The Next Generation, May 19, 1999, (visited Nov. 17, 1999) <http://www.secugen.com/pressrel.htm>, 2 pages.
SecuGen Unveils Fully Functional Fingerprint Recognition Solutions, May 11, 1999, (visited Nov. 17, 1999) <http://www.secugen.com/pressrel.htm>, 3 pages.
POLLEX Technology Ltd., The Expert in Fingerprint Identification—POLLog (visited Nov. 17, 1999) <http://www.pollex.ch/english/products/pollog.htm>, 2 pages.
Sony Fingerprint Identification Terminal (visited Nov. 17, 1999) <http://www.iosoftware.com/biosols/sony/fiu/applications/fit100.htm>, 2 pages.
Sony Fingerprint Identification Unit (FIU-700) (visited Nov. 17, 1999) <http://www.iosoftware.com/biosols/sony/fiu70/index.htm>, (Unit available late 1999).
Sony Fingerprint Identification Unit (visited Nov. 17, 1999) <http://www.iosoftware.com/biosols/sony/fiu/index.htm>, 3 pages.
Fujitsu Fingerprint Recognition Device (FPI-550) (visited Nov. 17, 1999) <http://www.iosoftware.com/biosols/fujitsu/fpi550.htm>, 2 pages.
Mitsubishi MyPass LP-1002 (visited Nov. 17, 1999) <http://www.iosoftware.com/biosols/mitsubishi/mypass.htm>, 2 pages.
SecureTouch PV—A Personal "Password Vault" (visited Nov. 17, 1999) <http://www.biometricaccess.com/securetouch_pv.htm>, 1 page.
Digital Descriptor Systems, Inc.–Profile (visited Nov. 17, 1999) <http://www.ddsi-cpc.com/pages/profile.html>, 3 pages.
Press Release: Printrak International Announces New Portable Fingerprint ID Solution, Dec. 10, 1996, (visited Nov. 17, 1999) <http://www.scott.net/-dg/25.htm>, 3 pages.
Corporate Profile (visited Nov. 17, 1999) <http://www.printrakinternational.com/corporate.htm>, 1 page.
Printrak Products (visited Nov. 17, 1999) <http://www.printrakinternational.com/Products.htm>, 1 page. (Discusses technology as early as 1974).
Verifier™ 200 Fingerprint Capture Devices, Cross Match Technologies, Inc., 2 pages, 1996–1997.
Verifier 200 Direct Fingerprint Reader, Cross Check Corporation, 2 pages, 1996–1997.
Verifier ™ 250 Fingerprint Capture Devices, Cross Match Technologies, Inc., 2 pages, 1996–1997.
Verifier 250 Small Footprint Direct Fingerprint Reader, Cross Check Corporation, 2 pages, 1996–1997.
Verifier™ 290 Fingerprint Capture Devices, Cross Match Technologies, Inc., 2 pages, 1996–1997.
Verifier 290 Direct Rolled Fingerprint Reader, Cross Check Corporation, 2 pages, 1996–1997.
Verifier™ 500 Fingerprint Capture Devices, Cross Match Technologies, Inc., 2 pages, 1998.
Biometric terminal, 1 page.
10–Print Imaging System, Cross Check Corporation, 2 pages, 1998.

Cross Match Technologies, Inc. (visited Mar. 25, 1999) <http://www.crossmatch.net/>, 1 page.

Cross Match Technologies, Inc.—Products Overview (visited Mar. 25, 1999) <http://www.crossmatch.net/new/products/product–index.html>, 1 page.

Cross Match Technologies, Inc.—Law Enforcement Systems (visited Mar. 25, 1999) <http://www.crossmatch.net/new/law/law–index.html>, 2 pages.

Cross Match Technologies, Inc.—Commercial Systems: Building On The Standard (visited Mar. 25, 1999) <http://www.crossmatch.net/new/commercial/commercial–index.html>, 2 pages.

Cross Match Technologies, Inc.—International Sales (visited Mar. 25, 1999) <http://www.crossmatch.net/new/sales/sales–index.html>, 1 page.

Cross Match Technologies, Inc.—Support (visited Mar. 25, 1999) <http://www.crossmatch.net/new/support/support–index.html>, 1 page.

Cross Match Technologies, Inc.—News—Press Releases—Verifier 400 Press Release (visited Mar. 25, 1999) <http://www.crossmatch.net/new/news–pr–050798.html>, 1 page.

Global Security Fingerscan™ System Overview (visited Jan. 11, 2000) <http://wwwu–net.com/mbp/sol/g/a9.htm>, 12 pages.

"Command Structure for a Low–Cost (Primitive) Film Scanner," *IBM Technical Disclosure Bulletin,* IBM Corp., vol. 35, No. 7, Dec. 1992, pp. 113–121.

Fingerprint Scan API Toolkit Version 1.x Feature List (Apr. 26, 2000) <http://www.mentalix.com/api/archive_fapiv-1.htm>, 3 pages.

"Image Acquisition System," *IBM Technical Disclosure Bulletin,* IBM Corp., vol. 29, No. 5, Oct. 1986, pp. 1928–1931.

Kunzman, Adam J. and Wetzel, Alan T., "1394 High Performance Serial Bus: The Digital Interface for ATV," *IEEE Transactions on Consumer Electronics,* IEEE, vol. 41, No. 3, Aug. 1995, pp. 893–900.

Mentalix Provides The First IAFIS–Certified Latent Print Scanning Solution For Windows (Jul. 23, 1999) <http://www.mentalix.com/pressreleases/fprintplook3_prel.htm>, 2 pages.

Venot, A. et al., "Automated Comparison of Scintigraphic Images" *Journal of Nuclear Medicine,* vol. 27, No. 8, Aug. 1986, pp. 1337–1342.

EPO Patent Abstract for Japanese Patent Publication No. 59–103474, published Jun. 14, 1984, 1 page.

EPO Patent Application for Japanese Patent Publication No. 10–079017, published Mar. 24, 1998, 1 page.

EPO Patent Application for Japanese Patent Publication No. 11–167630, published Jun. 22, 1999, 1 page.

Sluf js F. et al.; "An on–chip USA–powered three–phase up/down DC/DC converter in a standard 3.3 V CHOS process" 2000 IEEE International Solid–State Circuits Conference. Digest of Technical Papers (Cat. No. 00CH37056), 2000 IEEE International Solid–State Circuits Conference. Digest of Technical 2000, Piscataway, NJ, USA, IEEE, USA ISBN: 0–7803–5853–8.

European Patent Office, Patent Abstract of Japan, Publication No. 10262071, Sep. 29, 1998; one page.

European Patent Office, Patent Abstract of Japan, Publication No. 11252489, Sep. 17, 1999, one page.

* cited by examiner

RECHARGEABLE MOBILE HAND-HELD FINGERPRINT SCANNER WITH A DATA AND POWER COMMUNICATION INTERFACE

This application is a continuation of PCT/US99/22709, filed Oct. 1, 1999. Both this application and PCT/US99/22709 claim benefit of U.S. provisional application No. 60/140,754, filed Jun. 25, 1999, which is hereby incorporated by reference in its entirety.

BACKGROUND OF THE INVENTION

1. Field of the Invention

The present invention relates generally to fingerprint scanning and imaging.

2. Related Art

Biometrics are a group of technologies that provide a high level of security. Fingerprint capture and recognition is an important biometric technology. Law enforcement, banking, voting, and other industries increasingly rely upon fingerprints as a biometric to recognize or verify identity. See, Biometrics Explained, v. 2.0, G. Roethenbaugh, International Computer Society Assn. Carlisle, Pa. 1998, pages 1–34 (incorporated herein by reference in its entirety).

Fingerprint scanners are available which capture an image of a fingerprint. A signal representative of the captured image is then sent over a data communication interface to a host computer for further processing. For example, the host can perform one-to-one or one-to-many fingerprint matching.

However, such fingerprint scanners are typically attached or tethered to a computer. These fingerprint scanners can rely upon power from a separate plug or through a Universal Serial Bus (USB) interface. See, e.g., fingerprint scanners made by Digital Persona, Veridcom, and SecurGen.

Mobile use is increasingly desired in biometric applications, such as law enforcement. Police and other users need a portable, hand-held device to easily capture fingerprint images in the field. The portable hand-held device must be powered reliably. Conventional fingerprint scanners tethered to a personal computer cannot meet this need.

SUMMARY OF THE INVENTION

The present invention provides a mobile, hand-held fingerprint scanner that is recharged by a powered data communication interface. Data and recharging power is carried over the same interface. A separate plug for power is not needed. The fingerprint scanner can then be inserted quickly and easily in a docking station as only a single data and power communication interface need be coupled. This is particularly advantageous in law enforcement applications where mobile use is important and safety can be compromised if a mobile scanner does not couple to a docking station quickly and easily.

In one embodiment, the mobile, hand-held fingerprint scanner includes a rechargeable power supply and a data and power communication interface. The rechargeable power supply powers the fingerprint scanner during mobile use. In one example implementation, the rechargeable power supply includes at least one rechargeable battery, a charging circuit, and a voltage regulator circuit. The charging circuit regulates the charging (i.e. the rate) of a rechargeable battery when the fingerprint scanner is receiving power through the data and power communication interface. The voltage regulator circuit maintains a substantially constant output system voltage from the rechargeable battery during mobile use. Further, in one preferred example, the data and power communication interface is a universal serial bus (USB). The data and power interface of the present invention is not limited to USB. In general, any data communication interface that provides for power in its protocol may be used, such as, an IEEE 1394 interface.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated herein and form part of the specification, illustrate the present invention and, together with the description, further serve to explain the principles of the invention and to enable a person skilled in the pertinent art to make and use the invention.

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE EMBODIMENTS

According to the present invention, a mobile, hand-held fingerprint scanner is recharged by a data and power communication interface. The term "data and power interface" refers to any communication interface that transfers data and provides power. The data and power interface of the present invention can include, but is not limited to, Universal Serial Bus (USB) or IEEE 1394.

Figure 1:
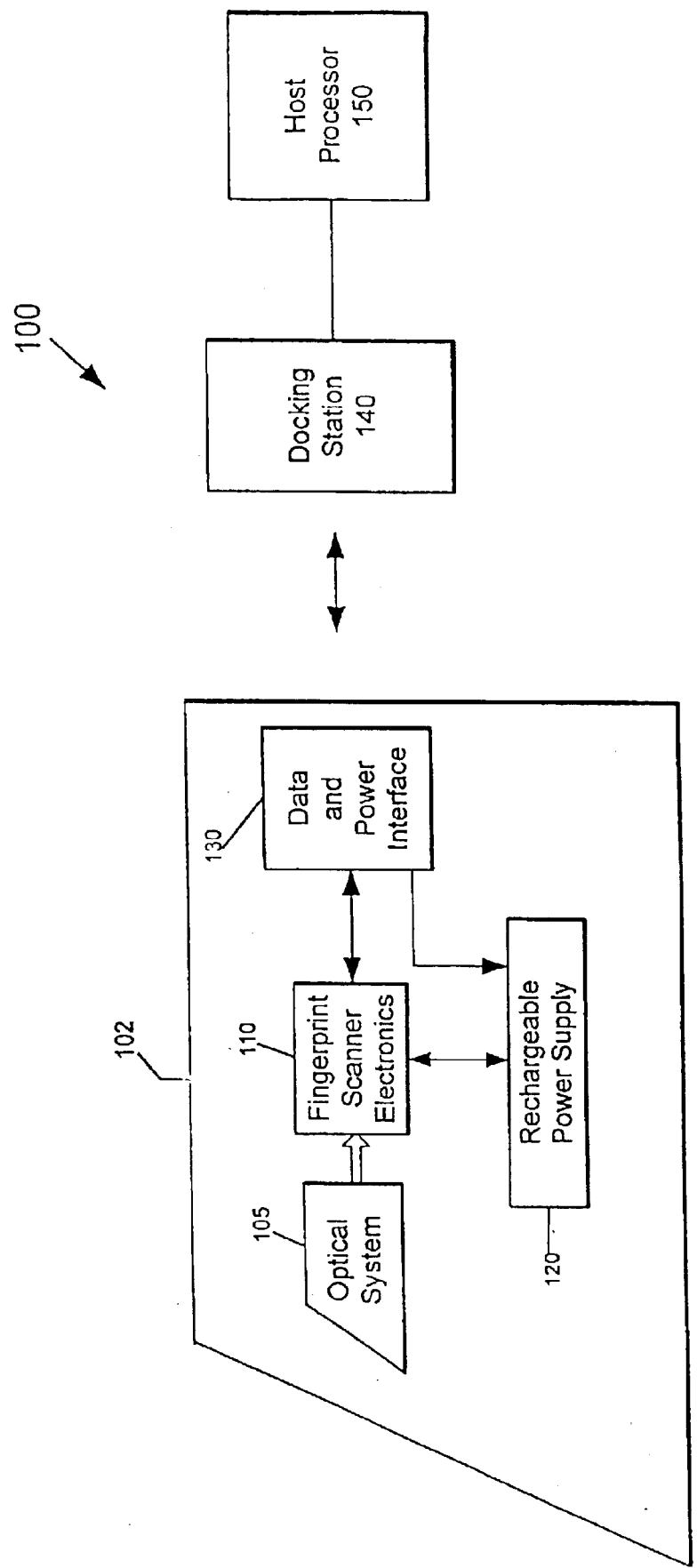
FIG. 1 is a diagram of a mobile, hand-held fingerprint scanner and docking system according to one embodiment of the present invention.

FIG. 1 shows a mobile, hand-held fingerprint scanner and docking system 100 according to one embodiment of the present invention. System 100 includes a mobile, hand-held fingerprint scanner 102, docking station 140 and a host processor 150. Fingerprint scanner 102 is a portable, hand-held scanner that detects and stores images representing part or all of a fingerprint. For convenience, the term "fingerprint image" is used herein to refer to any type of detected fingerprint including but not limited to an image of all or part of one or more fingerprints, a rolled fingerprint, a flat stationary fingerprint, a palm print, and/or prints of multiple fingers. Fingerprint scanner 102 is detachably coupled to docking station 140. Stored images are then downloaded from fingerprint scanner 102 through docking station 140 to a host processor 150.

In one embodiment, fingerprint scanner 102 includes an optical system 105. For example, optical system 105 can include a prism and a lens system, as described in U.S. Pat. No. 5,900,993 (incorporated herein by reference). Other optical systems can be used in the present invention as would be apparent to a person skilled in the art.

Optical system 105 outputs a fingerprint image to fingerprint scanner electronics 110. Fingerprint scanner electronics 110 detects the image and generates an electrical signal representative of the detected signal. The signal is then stored in a memory for subsequent download through data and power interface 130.

According to the present invention, rechargeable power supply 120 is coupled to fingerprint scanner electronics 110 (and electrical components, if any, in optical system 105) and data and power interface 130. Rechargeable power supply 120 provides power for the electronic components in fingerprint scanner 102, including fingerprint scanner electronics 110 and any electrical components in optical system 105, such as, a shutter, lens cover, or drive unit(s) for the lens system. Rechargeable power supply 120 is able to power the fingerprint scanner 102 when the scanner is in active, mobile use out of the docking station 140. According to a further feature, when the fingerprint scanner 102 is returned to docking station 140, power is provided through data and power interface 130 to recharge rechargeable power supply 120. No separate plug or power connection is needed. This is especially important in time-sensitive and safety critical applications, such as law enforcement. A police officer needs to be able to return fingerprint scanner 102 to docking station 140 in a simple and rapid fashion such that a connection is made quickly and reliably.

In one preferred example, data and power interface 130 is a universal serial bus (USB). A USB includes four pins (or channels). Two pins (+,−) carry a differential data signal, a third pin carries power, and a fourth pin is ground. The data and power interface of the present invention is not limited to USB. In general, any data communication interface that provides for power in its protocol may be used, such as, the IEEE 1394 High Performance Serial Bus (also called a FIREWIRE interface). See, e.g., Randall, "Solutions: Tutor, a Serial Bus on Speed," PC Magazine May 25, 1999, pp. 201–203 (incorporated herein by reference).

Docking station 140 can hold fingerprint scanner 102 in a variety of configurations depending upon a particular application and environment. For example, in a law enforcement application, docking station 140 may be a holder mounted in a police car. Host processor 150 can be any type of computer, processor(s), or logic which can receive and process fingerprint images detected by the fingerprint scanner 102. In one example, host processor 150 includes software for performing one-to-one or one-to-many fingerprint matching and recognition.

In another example, host processor 150 transmits detected fingerprint data to another processor for matching and recognition. For instance, if host processor 150 is in a law enforcement vehicle, host processor 150 can transmit detected fingerprint data to another processor at a police station or FBI office with access to a larger database for matching and recognition over a broader range of data.

In a law enforcement application, host processor 150 can further assemble the detected images into a format compatible with a local, county, or state AFIS or the NCIC or NCIC 2000 service. National Crime Information Center (NCIC) is an on-line information service jointly maintained by the Federal Bureau of Investigation (FBI) and criminal justice agencies throughout the United States and its territories. NCIC is being replaced by NCIC 2000, which will provide all NCIC services and new services. The new services include fingerprint matching, additional information files, and image files.

Figure 2:
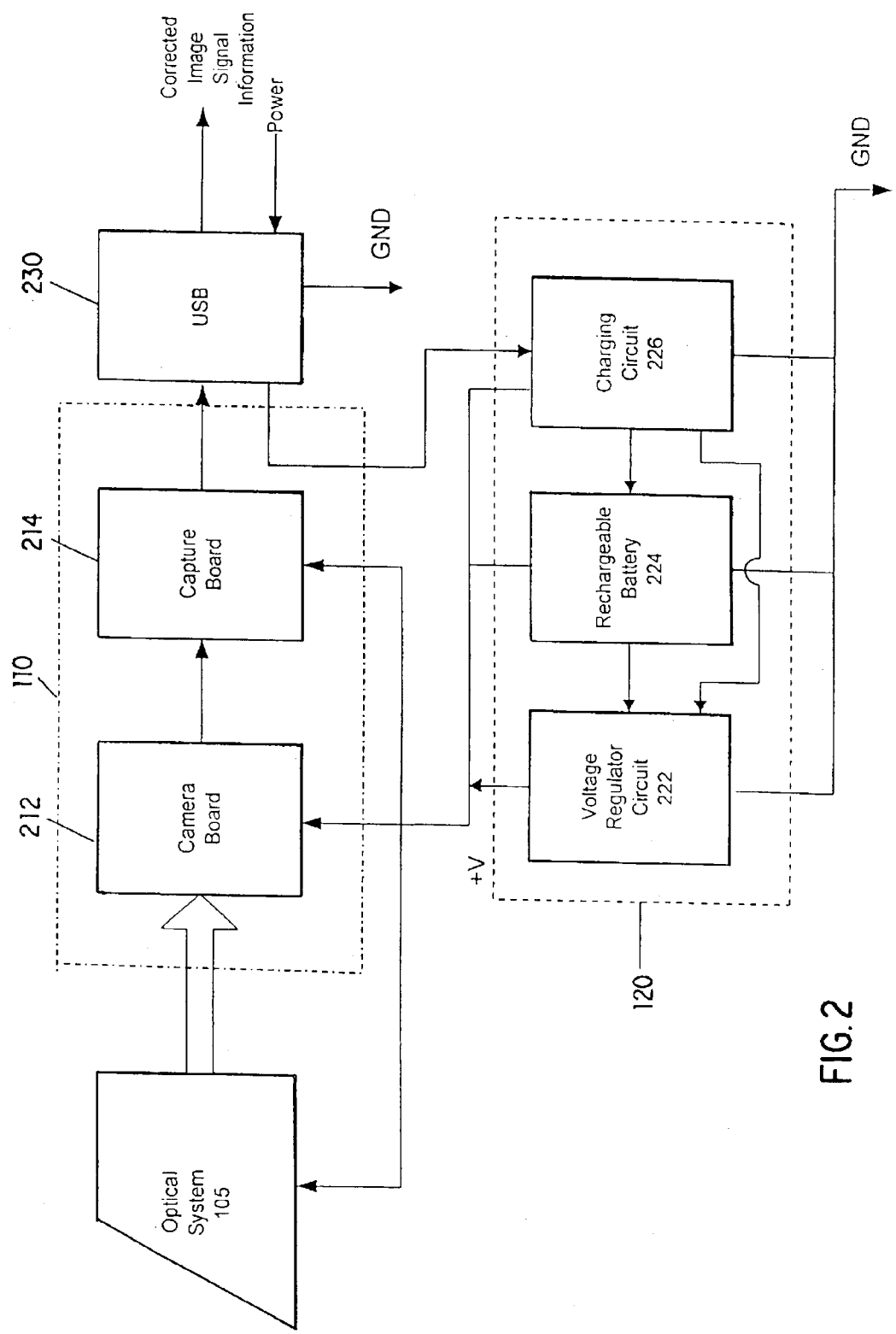
FIG. 2 is a diagram of a mobile, hand-held fingerprint scanner according to one embodiment of the present invention.

FIG. 2 is a diagram showing mobile, hand-held fingerprint scanner 102 in further detail according to one embodiment of the present invention. Fingerprint scanner electronics 110 includes a camera board 212 and a capture board 214. Camera board 212 includes a CMOS square pixel array. For example, a CMOS camera manufactured by Motorola Corporation can be used. Capture board 214 includes a memory for storing detected fingerprint images. Other circuitry and/or processing capability, such as, a frame grabber, analog/digital converter, and system controller can be provided as would be apparent to a person skilled in the art given this description. Such functionality can be provided all or in part, as desired, in the camera card 212, capture card 214, a stand-alone component, docking station 140 or host processor 150. In one example, image processing and finger print matching and recognition operations are carried out primarily in host processor 150. Processing operations related to detecting and storing a detected image signal are carried out in capture board 214.

Rechargeable power supply 120 includes voltage regulator circuit 222, at least one rechargeable battery 224, and charging circuit 226. Data and power interface 230 is a Universal Serial Bus (USB). Voltage regulator circuit 222 maintains a substantially constant output system voltage from rechargeable battery 224 during mobile use and while nested in docking station 140. In one preferred example, a relatively low system voltage of about 3 volts can be output to power a CMOS camera (compared to 12 volts for a charge-coupled-device (CCD) camera). Charging circuit 226 regulates the charging (i.e., the rate of charging) of a rechargeable battery 224 when fingerprint scanner 102 is receiving power through Universal Serial Bus 230. In one example, charging circuit 226 is connected to charge voltage regulator circuit 222 and rechargeable battery 224 with power from USB 230. Rechargeable battery 224 is coupled to voltage regulator circuit 222. Other configurations and arrangements can be used. Any known charging circuit and voltage regulator circuit can be used in accordance with this description as would be apparent to a person skilled in the art.

Example Mobile Hand-Held Fingerprint Scanner

Figure 3A:
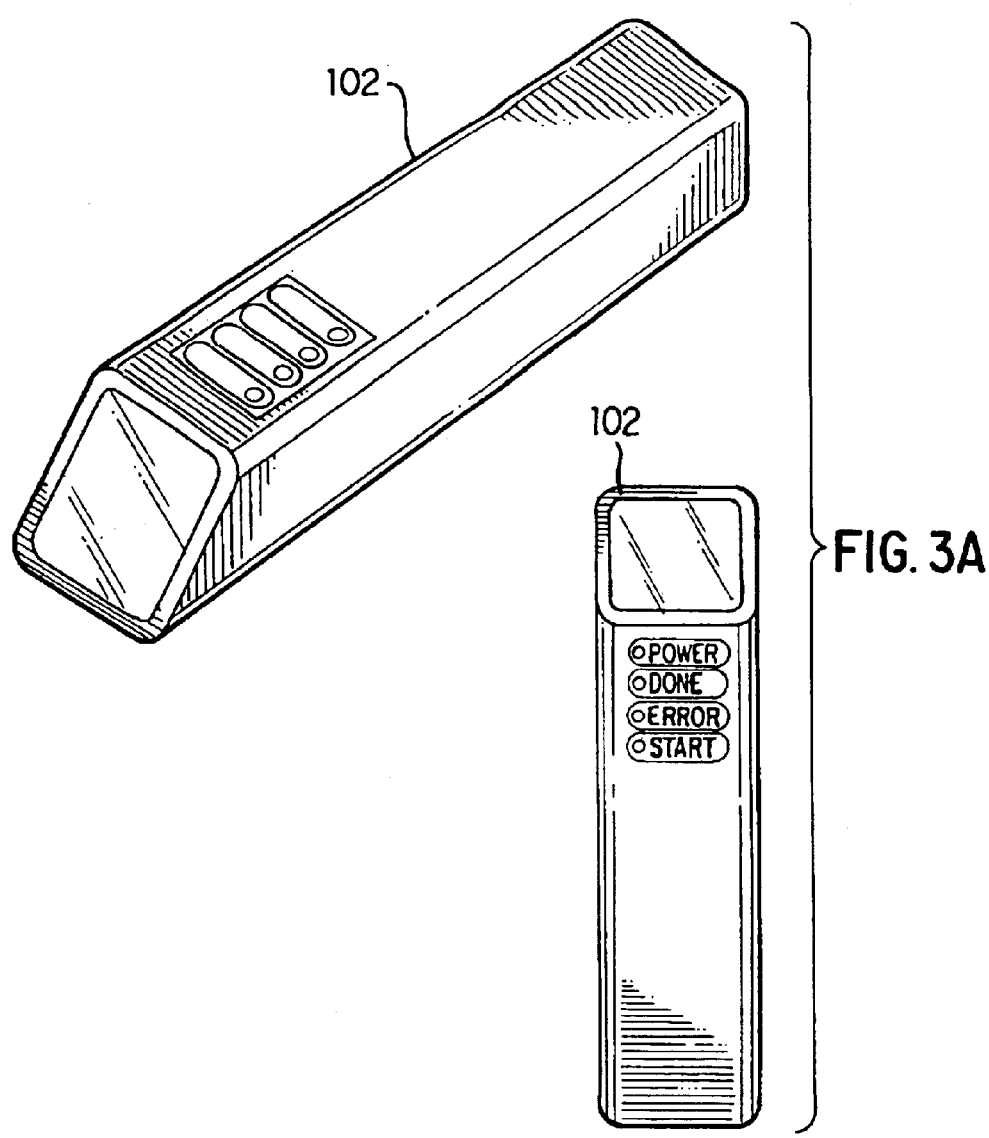
FIGS. 3A and 3B are drawings of an example implementation of a mobile, hand-held fingerprint scanner used in a law enforcement application according to the present invention.
Figure 3B:
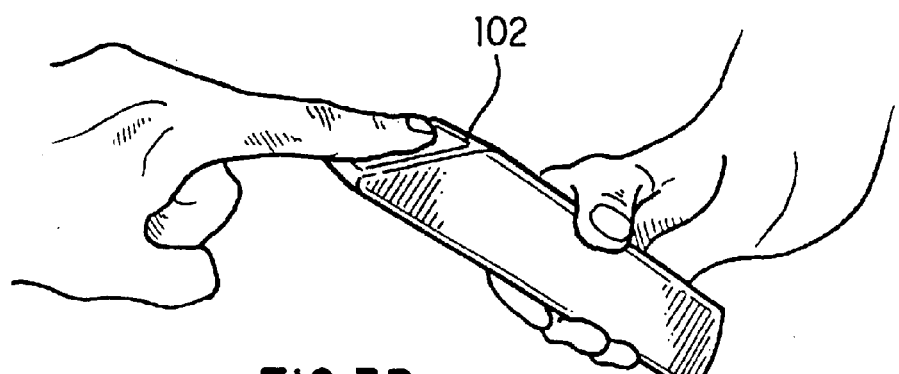

FIGS. 3A and 3B are drawings of an example implementation of a mobile, hand-held fingerprint scanner (also called a live scan device) used in a law enforcement application according to the present invention. FIG. 3A shows two views (top view and a view from an angle) of an example fingerprint scanner 102 according to the present invention. Fingerprint scanner 102 can be used with a FBI Mobile Imaging Unit (MIU) software application in host processor 150 to support NCIC 2000 functions in mobile law enforcement vehicles. The MIU provides a user interface, supports various peripheral devices, and transmits information in NCIC 2000-defined formats. The mobile fingerprint live scan device 102 can operate as a peripheral to the MIU (or to a processor that performs MIU-equivalent functions).

Fingerprint scanner 102 captures single (right or left index) fingerprint images in the environment of a law enforcement vehicle (see FIG. 3B). Fingerprint scanner 102 communicates the fingerprint images to a mobile host processor 150 in the vehicle. Fingerprint scanner 102 does not compromise officer safety when used by a single officer working with an unknown subject in a remote location. Hence, its small size, light weight, and mobility in the vicinity of the patrol car are vital to law enforcement. The ability to provide electrical power to fingerprint scanner 102 and support data transfer to the mobile host processor 150 without a tether is also highly desirable to law enforcement.

Further, fingerprint scanner 102 is sufficiently rugged for extended use in a mobile environment. The housing for fingerprint scanner 102 is a machined aluminum enclosure providing a rugged, durable device that can sustain the rigors of harsh temperature environments associated with portable/mobile use with mass handling.

Host processor 150 includes or is coupled through a wireless communication link to other system databases or services (such as NCIC 2000). A software interface which is TWAIN compliant is included for easy integration and Plug and Play (PnP) connectivity.

Fingerprint scanner 102 integrates optical system 105 and an internal processor in electronics 110 to make up a complete, self-contained unit. The optics provide forensic quality image capture that meets or exceeds most image matching requirements.

The hardware interface of the fingerprint scanner 102 utilizes an industry standard USB connection 230 in one example. USB interface 230 eliminates the need for costly digitizer boards, providing immediate return on investment.

Fingerprint scanner 102 is ergonomically designed to fit the hand naturally. The oblong, cylindrical shape (similar to a flashlight), does not contain sharp edges. The device is small enough to be gripped by large or small hands without awkward or unnatural movement. The device is comfortable to use without muscle strain on the operator or subject. In one example, fingerprint scanner 102 is 1.5×8.0×1.5 inches (height×length×width), weighs about 340 grams (12 oz.), and has an image platen size of about 1"×1".

Fingerprint scanner 102 has controls and status indicators on the front-face of the unit for single (left or right) hand operation. The non-intimidating appearance of the fingerprint scanner 102 is designed to resemble a typical flashlight—a device that is not generally threatening to the public. Fingerprint scanner 102 has no sharp edges and is constructed of a light-weight aluminum housing that is coated with a polymer to give the device a "rubberized" feel. Because fingerprint scanner 102 is small and lightweight, it may be carried on the officer's utility belt upon exiting a vehicle. The device is designed for one hand use, allowing the officer to have a free hand for protective actions. Fingerprint scanner 102 is designed for harsh environments to sustain issues such as dramatic temperature changes and non-intentional abuse.

Fingerprint scanner 102 exchanges data with the mobile host processor 150 via a docking station 140. The docking station 140 serves as a cradle that easily guides the fingerprint scanner 102 into position blindly, allowing the officer to focus on safety issues rather than the device operation. Docking station 140 is small and compact for easy placement in a tight space. Using a simple USB cable, the docking station 140 transmits data and charges the rechargeable battery 224 through a simple, single connection.

Fingerprint scanner 102 captures a single image and stores the captured image in any type of portable media (not shown). Such portable media for example can be memory integral to or coupled to receive output from camera board 212. Random-access memory (RAM) backed-up by rechargeable battery 224 is used in one embodiment of the present invention. Rechargeable battery 224 can be a Commercial Off The Shelf (COTS) Nickel Cadmium battery. The low-voltage battery (3.3 VDC) powers fingerprint scanner 102. Other types of memory (flash memory, non-volatile memory, floppy drives, disks, mini-floppy drives, etc.) can be used in alternative embodiments of the present invention.

In one embodiment of the present invention, a captured image of a fingerprint print is stored locally in memory in fingerprint scanner electronics 110. For example, the memory can store the print without having to transmit the print using expensive radio-frequency transmission. Captured images of prints can be stored in mini-floppy drives (such as the available from Sandisk Corp. or Intel Corp.). In this way, multiple prints can be stored locally. This is especially important in border control and accident sight markets. A crime scene can also be better documented as prints of all people present can be captured. Such captured prints can then be distinguished from other latent images which are uncovered.

Fingerprint scanner 102 can meet the most strict NIST (ANSI-NIST CSL 1998) image requirements.

Fingerprint scanner 102 contains a simple push button and set of 3 LED's that provide user activation and status indication. The user need only press one button to activate the unit. Once activated, the fingerprint scanner 102 awaits a finger to be introduced to the fingerprint capture platen. The digital image (or analog) is automatically captured when an adequate image area is detected. The image is then tested for quality of data prior to notifying the operator with an indication (e.g., visual indication and/or audible tone) for acceptance. The detected image is scalable to conform to FBI provided software (cropped or padded to 512 pixels by 512 pixels), although the standard image size is 1"×1 ", 500 dpi, 256 levels of gray-scale (ANSI-NIST).

The digital fingerprint image output is stored in raw data format within memory (preferably a memory in fingerprint scanner 102). The raw data is then sent via the USB interface to host processor 150. Host processor 150 reformats the raw data into any desired or required image format. Scanner 102 can also store information that identifies the format of the raw data. Host processor 150 can then receive this information to determine what reformatting (e.g. cropping and/or padding), if any, is needed. For example, the raw data can be stored ins canner 102 in a 504×480 pixel image format. Host processor 150 can then reformat the 504×480 pixel format to a 512×512 image format or any other desired format.

In an example environment, fingerprint scanner 102 can meet the following criteria:

A WINDOWS operating system environment and FBI-provided fingerprint image processing algorithms are used in NCIC 2000 fingerprint transactions;

Fingerprint image sampling rate: 500 pixels per inch

Size at input to FBI-provided Software: Cropped or padded to 512 pixels by 512 pixels Software interface from live scan device to MIU: TWAIN Image Quality: Electronic Fingerprint Transmission Specification, FBI Criminal Justice Information Services 1) Appendix F, IAFIS Image Quality Specification Section 2 Fingerprint Scanners and 2) Appendix G, Interim IAFIS Image Quality Specification for Scanners; MIU Processing: FBI-provided fingerprint image processing in mobile computer.

Fingerprint scanner 102 is held in either hand and used to capture a person's fingerprint. The fingerprint is captured from a cooperative individual (frontal approach) or an uncooperative individual (handcuffed subject—most commonly face down). Fingerprint scanner 102 can be operated with one-hand, allowing the officer to have a hand ready for protective actions. The officer need not have fingerprinting knowledge to capture the fingerprint.

The fingerprint capture process is simple as pressing a button and applying the subject's finger. The fingerprint is automatically captured and a quality check is performed immediately. The unit emits a tone to indicate a completed process. The officer may introduce the unit to the docking station blindly, maintaining his eyes on the subject for safety. Once seated in the docking station, the fingerprint is automatically transferred to the mobile computer without operator intervention. The unit's batteries are charged while within the docking station and ready for the next operation.

Thus, the present invention provides a mobile, hand-held fingerprint scanner that is recharged by a powered data communication interface. Data and recharging power is carried over the same interface. A separate plug for power is not needed. The fingerprint scanner can then be inserted quickly and easily in a docking station, as only a single data and power communication interface need be coupled. This is particularly advantageous in law enforcement applications where mobile use is important and safety can be compromised if a mobile scanner does not couple to a docking station quickly and easily.

CONCLUSION

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A mobile, hand-held fingerprint scanner, comprising:
   an interface charged rechargeable power supply that powers the fingerprint scanner during mobile use; and
   a data and power communication interface that is configured to be coupled to a docking station,
   wherein data is communicated from said mobile, hand-held fingerprint scanner to a host processor via said data and power communication interface through said docking station and power is provided to charge said interface charged rechargeable power supply through said docking station when said data and power communication interface is coupled to said docking station, and wherein said data includes information representative of a fingerprint image captured by the mobile, hand-held fingerprint scanner; whereby, a dedicated plug for recharging a power supply separate from a data interface can be avoided.

2. The mobile, hand-held fingerprint scanner of claim 1, wherein said interface charged rechargeable power supply includes at least one rechargeable battery.

3. The mobile, hand-held fingerprint scanner of claim 2, wherein said interface charged rechargeable power supply includes a charging circuit that regulates the charging of said at least one rechargeable battery when the fingerprint scanner is receiving power through the powered data and power communication interface.

4. The mobile, hand-held fingerprint scanner of claim 3, wherein said charging circuit regulates the rate of charging of said at least one rechargeable battery.

5. The mobile, hand-held fingerprint scanner of claim 2, wherein said interface charged rechargeable power supply includes a voltage regulator circuit that maintains a substantially constant output system voltage from the rechargeable battery during mobile use.

6. The mobile, hand-held fingerprint scanner of claim 2, wherein said data and power communication interface comprises a universal serial bus (USB).

7. The mobile, hand-held fingerprint scanner of claim 2, wherein said data and power communication interface comprises an IEEE1394 compatible interface.

8. The mobile, hand-held fingerprint scanner of claim 2, wherein said at least one rechargeable battery comprises at least one nickel cadmium battery.

9. A method for communicating data from a mobile fingerprint scanner comprising the steps of:
   docking the mobile fingerprint scanner with a docking station to couple a data and power communication interface in the mobile fingerprint scanner to a docking station;
   charging a rechargeable power supply in the mobile fingerprint scanner with power carried over the data and power communication interface when docked with the docking station; and
   transmitting data from the mobile fingerprint scanner to a host processor over the data and communication interface when docked with the docking station, wherein the data includes information representative of a fingerprint image captured by the mobile fingerprint scanner.

10. The method of claim 9, wherein the rechargeable power supply includes at least one rechargeable battery, wherein said charging step comprises:
    regulating the charging of said at least one rechargeable battery when the fingerprint scanner is receiving power through the data and communication interface.

11. The method of claim 10, wherein said regulating step comprises:
    regulating the rate of charging of the at least one rechargeable battery.

12. The method of claim 9, wherein the interface charged rechargeable power supply includes a voltage regulator circuit, further comprising the step of:
    maintaining a substantially constant output system voltage from the rechargeable power supply during mobile use with the voltage regulator circuit.

13. The method of claim 9, wherein said docking step comprises:
    coupling the data and power communication interface with the docking station through a universal serial bus (USB).

14. The method of claim 9, wherein said docking step comprises:
    coupling the data and power communication interface with the docking station through an IEEE1394 compatible interface.

* * * * *